United States Patent [19]

Tsutsumi

[11] Patent Number: 5,224,181
[45] Date of Patent: Jun. 29, 1993

[54] IMAGE PROCESSOR
[75] Inventor: Naoji Tsutsumi, Kanagawa, Japan
[73] Assignee: Fuji Xerox Co., Ltd., Tokyo, Japan
[21] Appl. No.: 595,806
[22] Filed: Oct. 10, 1990
[51] Int. Cl.⁵ .............................................. G06K 9/20
[52] U.S. Cl. ..................................... 382/61; 358/452; 382/9; 382/57
[58] Field of Search ................... 382/61, 57, 1, 48, 41, 382/9; 358/453, 452

[56] References Cited

U.S. PATENT DOCUMENTS

| | | | |
|---|---|---|---|
| 4,542,378 | 9/1985 | Suganuma et al. | 382/61 |
| 4,553,261 | 11/1985 | Froessl | 382/61 |
| 4,558,374 | 12/1985 | Kurata et al. | 358/453 |
| 4,733,304 | 3/1988 | Homma et al. | 358/453 |
| 4,797,946 | 1/1989 | Katsuta et al. | 382/61 |
| 4,878,247 | 10/1989 | Wester-Ebbinghaus et al. | 382/1 |
| 4,965,678 | 10/1990 | Yamada | 358/453 |
| 5,033,102 | 7/1991 | Nakajima et al. | 382/61 |
| 5,038,393 | 8/1991 | Nanba | 382/61 |
| 5,048,106 | 9/1991 | Nakajima et al. | 382/61 |

Primary Examiner—Joseph Mancuso
Attorney, Agent, or Firm—Finnegan, Henderson, Farabow, Garrett & Dunner

[57] ABSTRACT

An image processor is disclosed which displays an image of a document on a display unit by storing image data of said document in a storing unit and providing the image data read from the storing unit to the display unit. The image processor includes a lattice image data memory for storing lattice image data from which a specified set of the lattice image data having a desired lattice pattern may be selected and superimposed on the image data read from the storing unit and provided to the display unit. A second document having the same lattice pattern superimposed on it, may also be simultaneously displayed on the display unit in order to facilitate editing of the documents.

14 Claims, 7 Drawing Sheets

IMAGE PROCESSOR

BACKGROUND OF THE INVENTION

1. Field of the Invention

This invention relates to an image processor for editing images.

2. Discussion of the Related Art

An image processor reads an image of a document using an image input unit, stores it in a memory in the form of image data, and subjects the stored image data to editing operations such as addition and deletion. As one of the editing operations, part of the read document is electronically cut and pasted to a predetermined place in another document. In such an electronic cutting and pasting operation, the document image to be cut and the destination document image are displayed either on a single display unit or on separate display units, and a cutting image portion in the document to be cut and a pasting place in the pasting (destination) document are similarly specified by a mouse, for example.

In the related art image processor, the cutting image portion and the pasting place are specified by the operator by selecting appropriate positions while looking at the screen. For this reason, it is not possible to cut or paste figures precisely. Particularly, shifts in position are noticeable when the same patterns must be juxtaposed.

SUMMARY OF THE INVENTION

The present invention has been made in view of the above circumstances and has an object of providing an image processor capable of specifying a place or area to be edited in an improved manner when performing an editing operation.

Additional objects and advantages of the present invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the image processor of this invention, which displays an image of a document on a display unit by storing image data of the document in a storing unit and providing the image data read from the storing unit to the display unit, comprises a lattice image data memory for storing lattice image data, and means for superimposing the image data read from the storing unit and the lattice image data read from the lattice image data memory on each other and providing the superimposed image data to the display unit.

Also, the lattice image data consists of a plurality of lattice image data whose patterns and intervals are different from one another.

In the present invention, when the image data of the document is read from the storing unit and displayed on the display unit, lattice image data having a predetermined pattern and interval is read from the lattice image data memory to display the lattice image data overlapped on the document image data. The lattice image is a regular pattern having a predetermined repetitive intervals. Therefore the position of the document image can be correctly recognized.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIGS. 7a-f is a timing chart showing the operation of the digital copying machine shown in FIG. 1;

DETAILED DESCRIPTION OF THE PREFERRED EMBODIMENT

Figure 1:
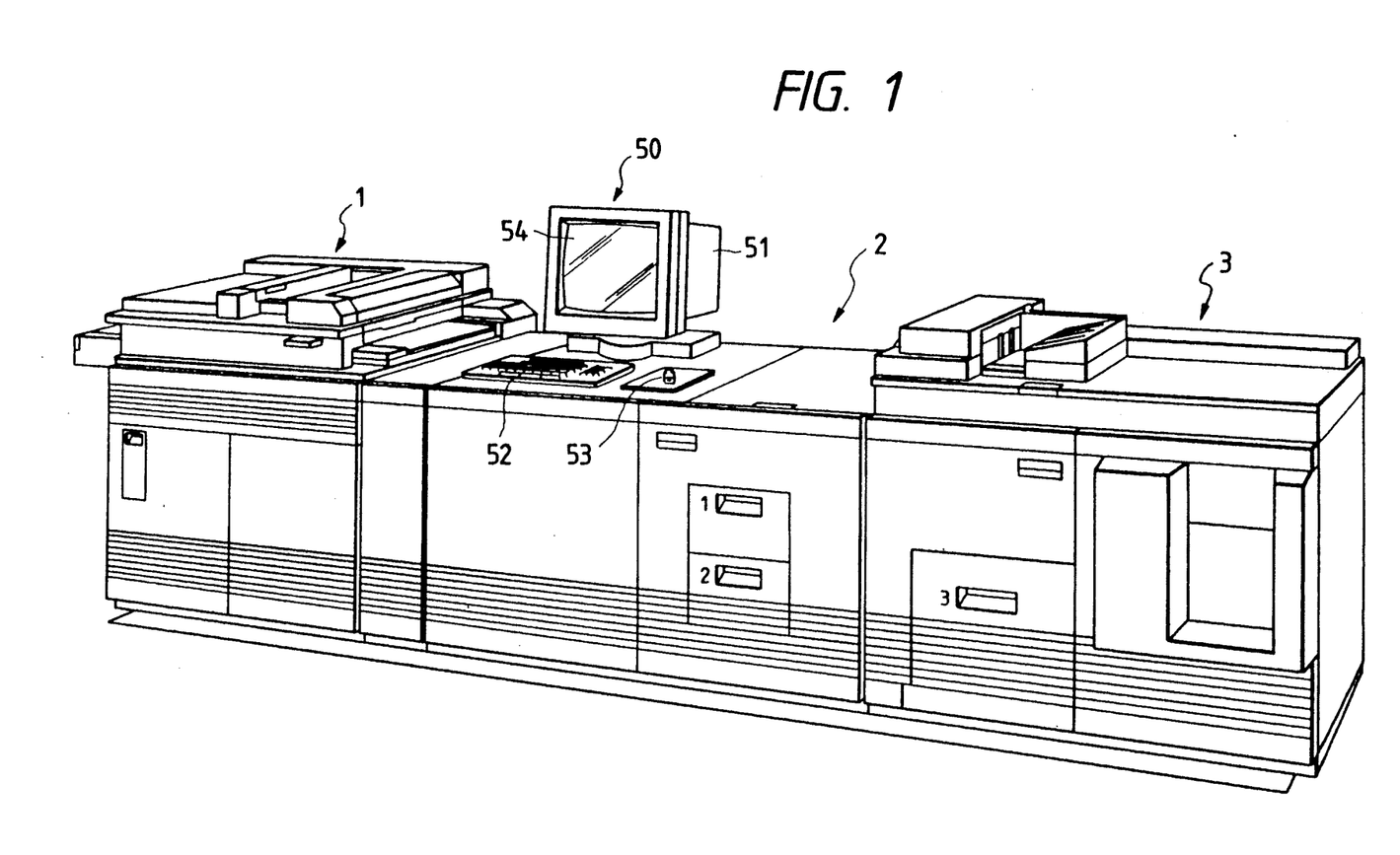
FIG. 1 is a general perspective view depicting a digital copying machine having an image processor of the present invention.

Referring to FIG. 1, there is shown a digital copying machine provided with an image processor of the present invention. The machine basically comprises scanning section 1 for reading a document, control section 2 for globally governing the control of the machine, and printing section 3 for transferring images onto recording sheets. As described below, the digital copying machine of this embodiment can operate both in a regular copying mode and in a cutting/pasting mode for image editing.

Figure 2:
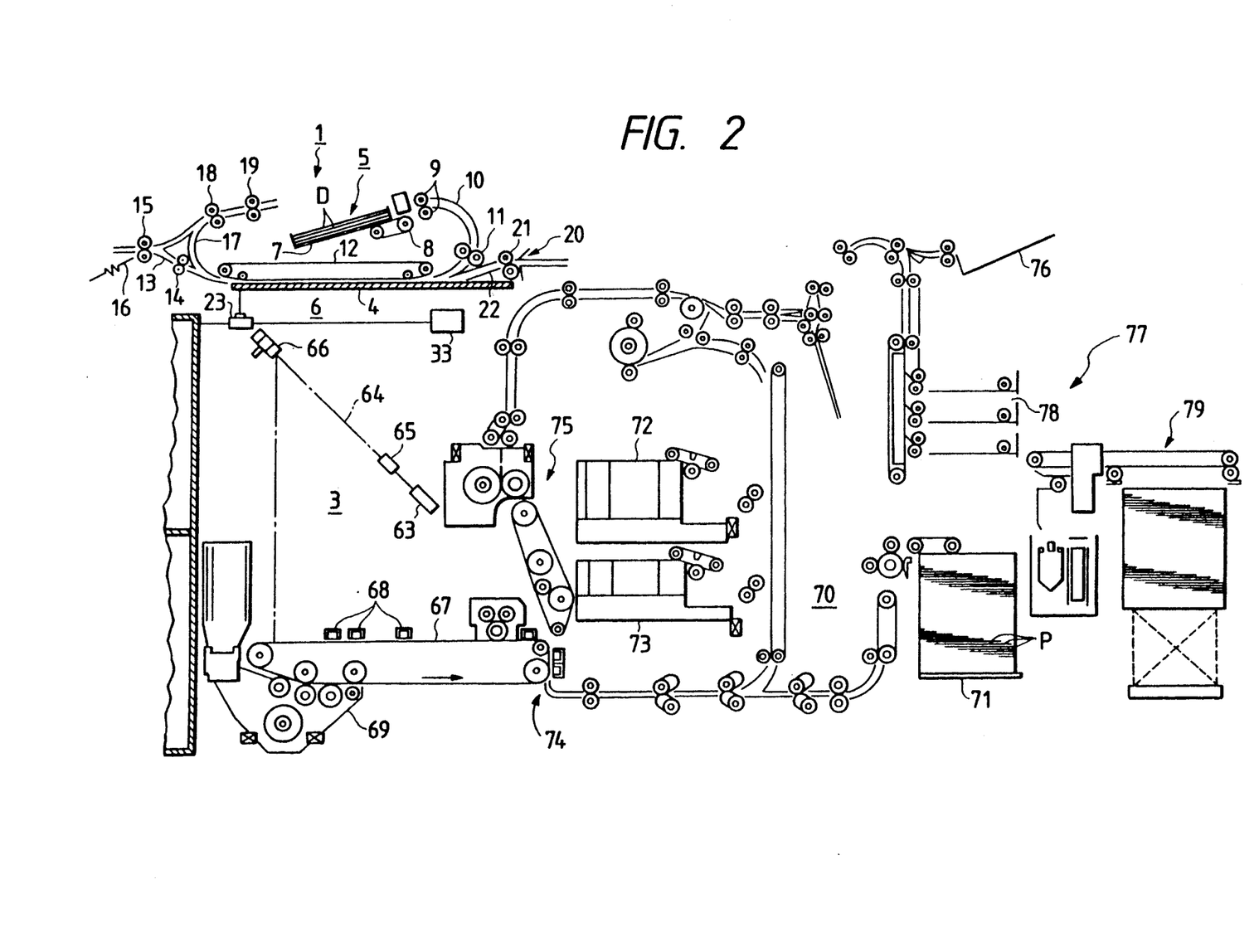
FIG. 2 is a schematic front view illustrating the internal structure of the digital copying machine shown in FIG. 1.

Referring to FIG. 2, scanning section 1 comprises automatic document handler 5 for automatically handling document D on transparent platen 4, and image input unit 6 for reading an image of document D placed on platen 4 by scanning.

Automatic document handler 5 allows three different modes to be selected: a normal automatic document handling mode (ADF mode), a recirculating automatic handling mode (RDH mode), and a semiautomatic document handling mode (SADH mode).

In the normal ADF mode, document D placed face-up on document tray 7 is picked up sheet by sheet by vacuum feed belt 8 from the lowermost side and forwarded to a predetermined position on platen 4 through document feed roller 9, bent chute 10, document feed roller 11, document feed belt 12, and the like. After being copied, document D is forwarded toward chute 13 by document feed belt 12 and discharged into catch tray 16 by document feed rollers 14 and 15. In the RDH mode, the copied document D is, instead of being directly discharged into catch tray 16, returned back to document tray 7 by document feed rollers 18 and 19 while passing through document return chute 17. In the SADH mode, document D is inserted from document entry slot 20, fed between document feed belt 12 and platen 4, and forwarded to a predetermined position by document feed belt 12.

Figure 3:
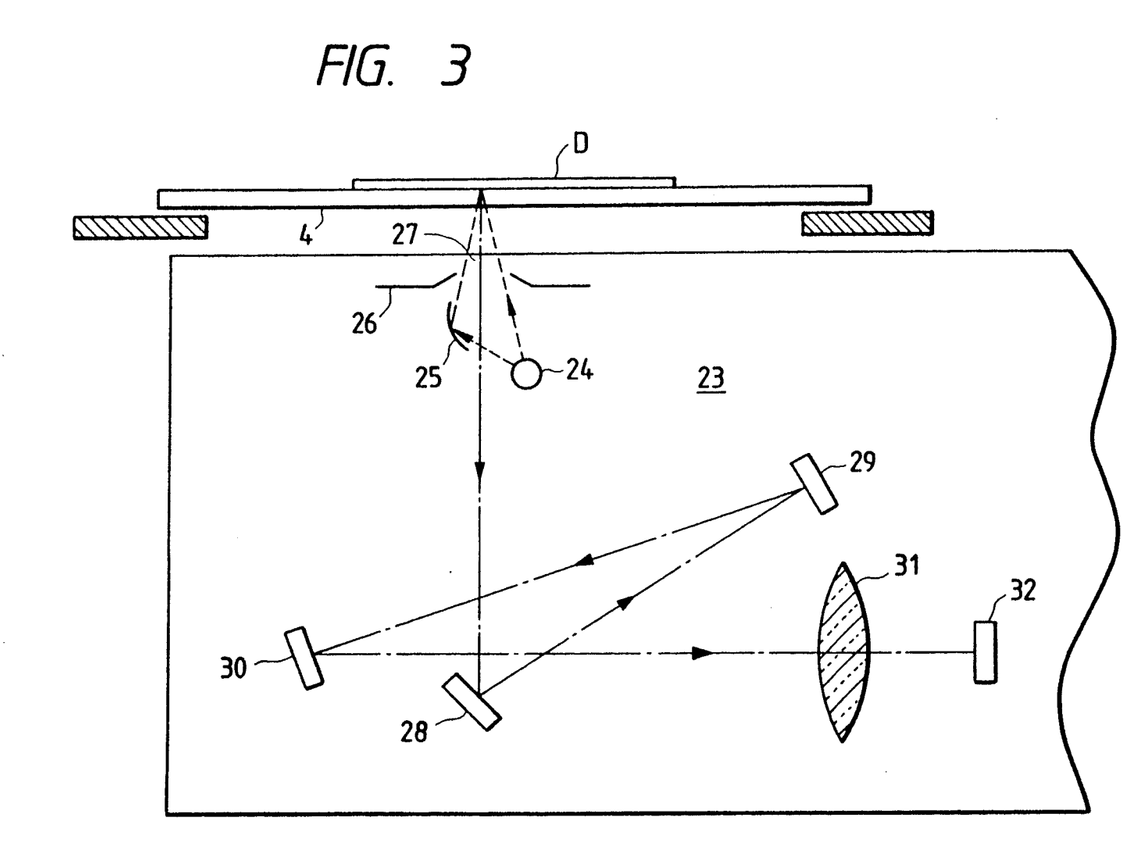
FIG. 3 is a schematic sectional view showing certain construction details of a document scanner for the digital copying machine shown in FIG. 1.

In image input unit 6, document scanner 23 is arranged at the lower portion of platen 4. FIG. 3 is a schematic sectional view showing certain construction details of the document scanner 23. Light from exposing lamp 24 irradiates document D by passing through slit 27 formed on slit plate 26 directly or by being reflected by reflecting plate 25. The reflected light from document D is reflected by mirrors 28, 29, and 30 to change its path, and focused on line image sensor 32 past lens 31. Document scanner 23 is constituted by exposing lamp 24, reflecting plate 25, slit plate 26, and mirrors 28 to 30, and 32, lens 31, and the like. Document scanner 23 is driven by scanning means 33 and performs reading of the image of document D on a page by page basis by reciprocating along the bottom surface of platen 4. Thus, a video signal corresponding to the image of document D is produced from image sensor 32.

Figure 4:
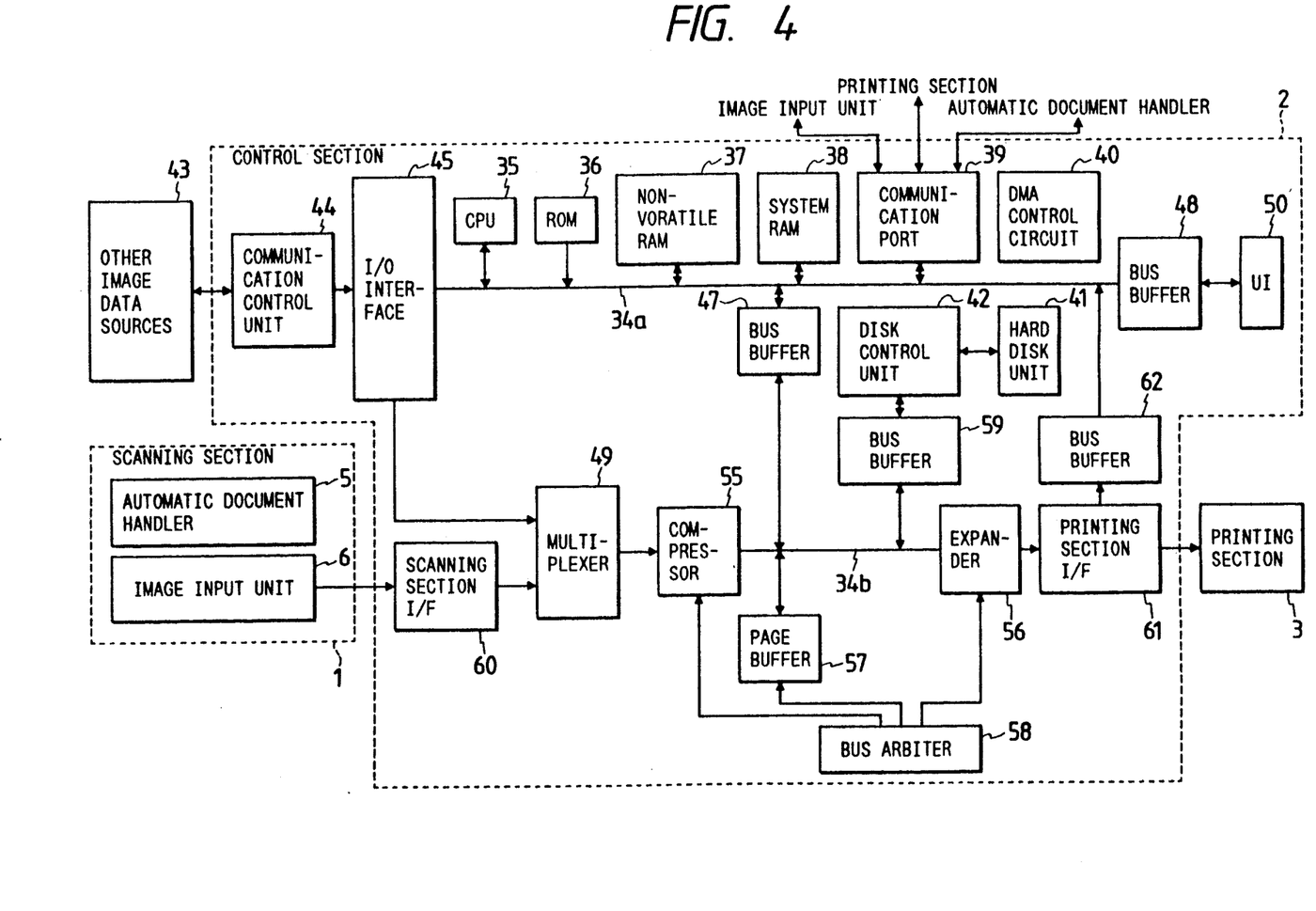
FIG. 4 is a block diagram showing a circuit of the digital copying machine shown in FIG. 1.

FIG. 4 shows a circuit of the digital copying machine shown in FIG. 1. The circuit is provided with system bus 34a and image data bus 34b. To system bus 34a there are connected CPU (central processing unit) 35, ROM (read only memory) 36, nonvolatile RAM (random access memory) 37, system RAM 38, communication port 39, DMA (direct memory access) control circuit 40. Input interface 45 is also connected to system bus 34a. Input interface 45 serves to receive image data form other image data sources 43 such as a personal computer, a work station, and a facsimile machine through communication control unit 44. To system bus 34a, image data bus 34b and user interface (UI) 50 are also connected through bus buffers 47 and 48, respectively.

UI 50 comprises display unit 51 capable of displaying an image on a pixel basis, keyboard 52, and mouse 53 as shown in FIG. 1, and serves to display such data as copying instructions and image editing instructions (to be described later) to the copying machine, and operating conditions of the copying machine. Display unit 51 includes touchscreen 54, which, in addition to the operation by keyboard 52 and mouse 53, allows a desired input to be made by touching a predetermined icon displayed thereon.

Figure 5:
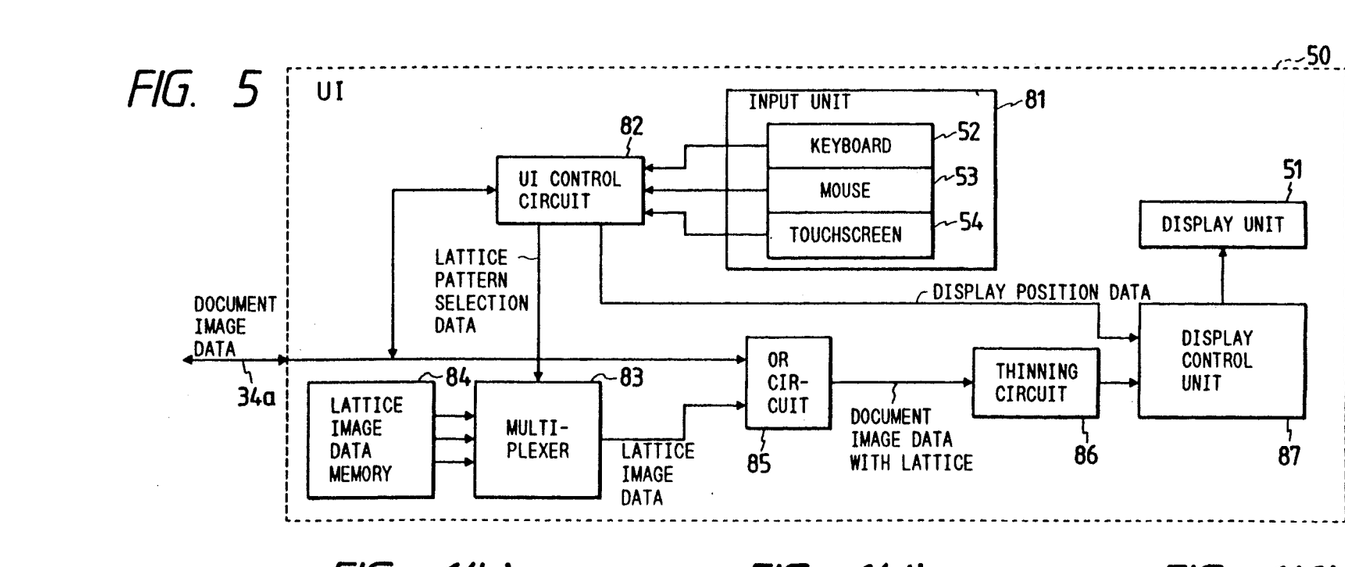
FIG. 5 is a block diagram showing an exemplary construction of a user interface.
Figure 6A:
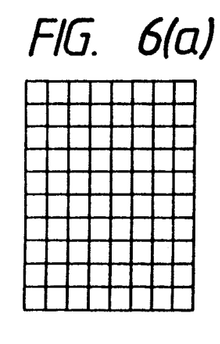
FIGS. 6(a) through 6(f) are diagrams showing exemplary lattice images.
Figure 6B:
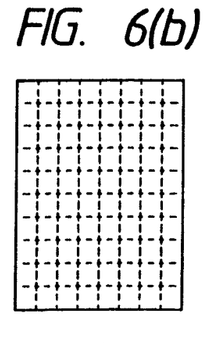
Figure 6C:
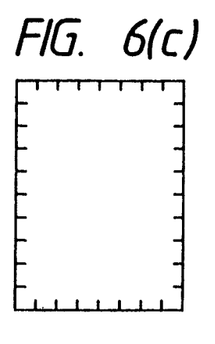
Figure 6D:
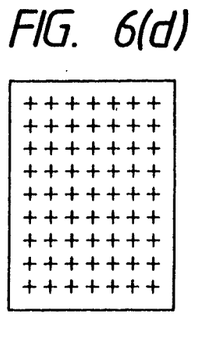
Figure 6E:
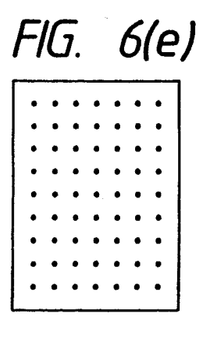
Figure 6F:
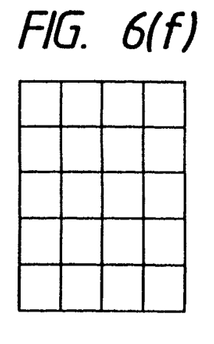

FIG. 5 is a block diagram showing construction details of UI 50. UI 50 comprises input unit 81, including keyboard 52, mouse 53, and touchscreen 54, for allowing a user to select functions and specify regions; UI interface controlling unit 82 for controlling various units within UI 50 and intercommunicating messages with control section 2; OR circuit 85 for overlapping lattice image data stored in lattice image data memory 84 and selected by multiplexer 83 upon document image data transmitted from control section 2; thinning circuit 86 for thinning the data to display it on display unit 51; display controller 87 for controlling the position of the image on display unit 51; and display unit 51 for displaying items to be selected and images. Lattice image data memory 84 stores a plurality of lattice image data in different versions of lattice patterns depicted by solid lines, broken lines, graduations, crosses, and points as shown in FIGS. 6(a) through 6(e). Further, each lattice image data also comes in different intervals such as 2 mm, 4 mm, 8 mm, 12 mm, 16 mm, 24 mm, and 32 mm. FIG. 6(f) is a version of FIG. 6(a) depicted with a wider interval. A set of intervals may be prepared in inches as well.

IN FIG. 4, compressor 55, expander 56, and page buffer 57 are connected to image data bus 34b. Compressor 55, expander 56, and page buffer 57 are selectively operated based on instructions from bus arbiter 58 that serves to prevent contention between the buses. Bus buffer 59 is provided between image data bus 34b and disk control unit 42 that controls the write/read operations of hard disk unit 41.

The image data from scanning section 1 is applied to compressor 55 through scanning section interface 60 and multiplexer 49, while expander 56 outputs are fed to printing section 3 through printing section interface 61. Bus buffer 62 is provided between scanning section interface 61 and system bus 34a.

Printing section 3 is formed of a raster output scanner (ROS) of, e.g., the laser printer type utilizing electrophotographic technology. As shown in FIG. 2, beam 64 from laser 63 is modulated in accordance with the image data by acousto-optic modulator 65 and scans (traverses) belt-like photoreceptor 67 by being reflected by the mirrored facets of rotating polygon 66 to expose photoreceptor 67 to image radiation. Photoreceptor 67 is uniformly charged by a plurality of corotrons 68 and a latent electrostatic image is formed thereon by being exposed to the modulated laser beam. The latent electrostatic image is developed by developing unit 69 thereby to form a toner image on photoreceptor 67. This toner image on photoreceptor 67 is then transferred at transfer section 74 to recording sheet P as it is brought forward from either main sheet feed tray 71 or auxiliary sheet feed trays 72 and 73 of sheet feeder 70, and then output as an image on recording sheet P. Recording sheet P having the image transferred thereon is forwarded to fusing unit 75 where the toner image is fused, and a final copy is forwarded either to discharge tray 76 or finisher 77. Finisher 77 includes a stitcher 78 for stitching or stapling the copies together to form books and a thermal binder 79 for adhesively binding the copies into books.

The operation of the above described digital copying machine will now be described wherein automatic document handler 5 is operated in the ADF mode. An instruction to start copying is given using keyboard 52, mouse 53, or touchscreen 54 of UI 50 as shown in FIG. 1 or 4. This instruction is applied to CPU 35 through bus buffer 48 and system bus 34a, and control data that puts into effect the start operation is then applied to automatic document handler 5 at scanning section 1 through communication port 39 in accordance with a program written in ROM 36. Document D resting face-up on document tray 7 is then picked up sheet by sheet by vacuum feed belt 8 from the lowermost side to be forwarded to a predetermined position on platen 4 through document feed roller 9, bent chute 10, document feed roller 11, document feed belt 12, and the like. Upon completion of the placement of document D, control data that puts into effect the start operation is applied, in turn, to image input unit 6 at scanning section 1 through communication port 39, and, as a result, document scanner 23 is moved along the bottom surface of platen 4 to read the image on document D and obtain the video data thereof.

The video signals from scanning section 1, on one hand, are digitized by an image processing circuit (not shown) arranged within scanning section 1 and applied to control section 2 after being subjected to predetermined image processing.

The image data from scanning section 1, on the other hand, is applied to compressor 55 through scanning section interface 60 and multiplexer 49. Compressor 55 performs, for example, a reversible adaptive compressing operation. For example, character documents can be compressed to about 1/10, and halftone images, to about $\frac{1}{3}$ the original. Compressor 55 has also a through mode allowing the image data to bypass the compressing operation.

Figures 7A, 7B:
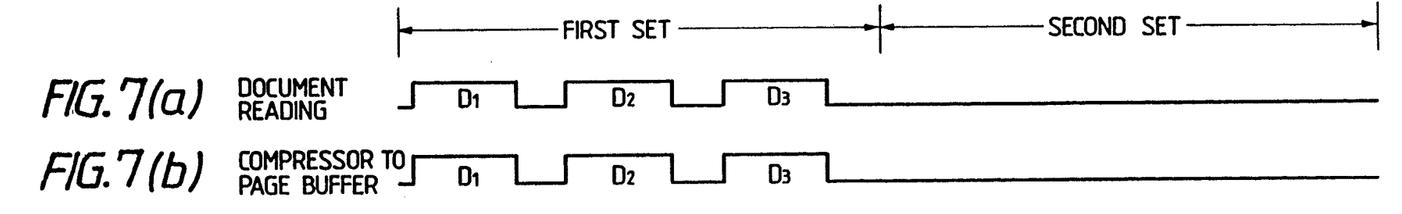
Figure 7C:
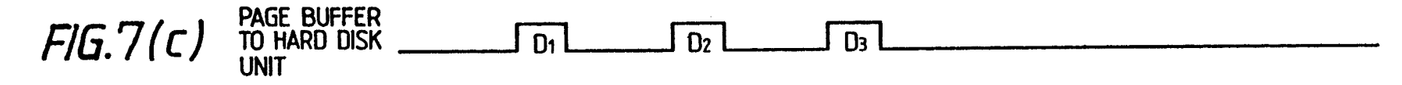
Figure 7D:
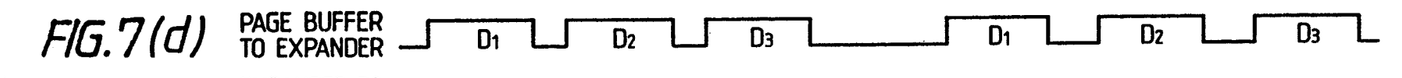
Figure 7E:
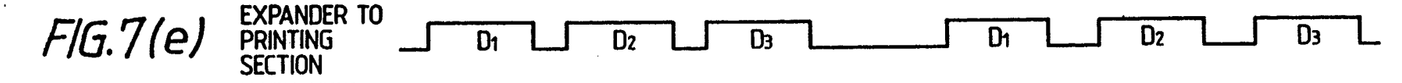
Figure 7F:
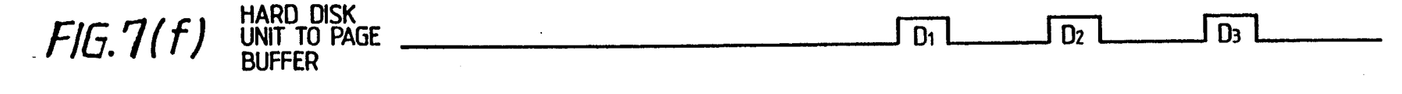

A case in which two or more copies (sets) are prepared for a document consisting of three pages, $D_1$, $D_2$, $D_3$ will now be described as an example. As shown in FIG. 7(a), three pages $D_1$, $D_2$, $D_3$, are sequentially read at scanning section 3 to obtain the image data corresponding to the image of each document page. Each image data thus obtained is compressed by compressor 55 and each compressed image data is written to page buffer 57 by DMA transfer as shown in FIG. 7(b). To print each image for the second copy et seq., DMA transfer is employed to write the compressed image data from page buffer 57 to hard disk unit 41 through bus buffer 59 and disk control unit 42 as shown in FIG. 7(c). As shown in FIG. 7(d), for the first copy, the compressed image data of each document is transmitted from page buffer 57 to expander 56 by DMA. The 3-channel DMA transfer is managed by bus arbiter 58 and DMA control circuit 40.

The compressed image data applied to expander 56 is recovered into the original image data by the expanding operation and the recovered image data is then applied to printing section 3 through printing section interface 61 as shown in FIG. 7(e). Expander 56 also has a through mode allowing the image data to bypass the expanding operation.

At printing section 3, beam 64 from laser 63 is modulated in accordance with the image data to form a latent electrostatic image on photoreceptor 67. The latent electrostatic image is developed by developing unit 69 into a toner image. The toner image is then transferred onto a recording sheet at transfer section 74, then fused at fuser 75, and discharged into discharge tray 76. Accordingly, the images of the document are printed on the recording sheets in the order of pages $D_1$, $D_2$, $D_3$ to obtain the first copies.

From the second copies onward, no document reading or image data compressing operation is performed. Instead, each compressed image data written to hard disk unit 41 during processing of the first copy is read as shown in FIG. 7(f), transmitted to page buffer 57, and further transmitted to expander 56 from page buffer 57. The compressed image data thus transmitted is expanded in the same manner as in the first copy and forwarded to printing section 3 where the second set copies are produced.

By repeating the above operation, a desired number of copies are discharged into discharge tray 76 at printing section 3 in the order of $D_1$, $D_2$, $D_3$, $D_1$, $D_2$, $D_3$, .. . in sorted form.

Figure 8:
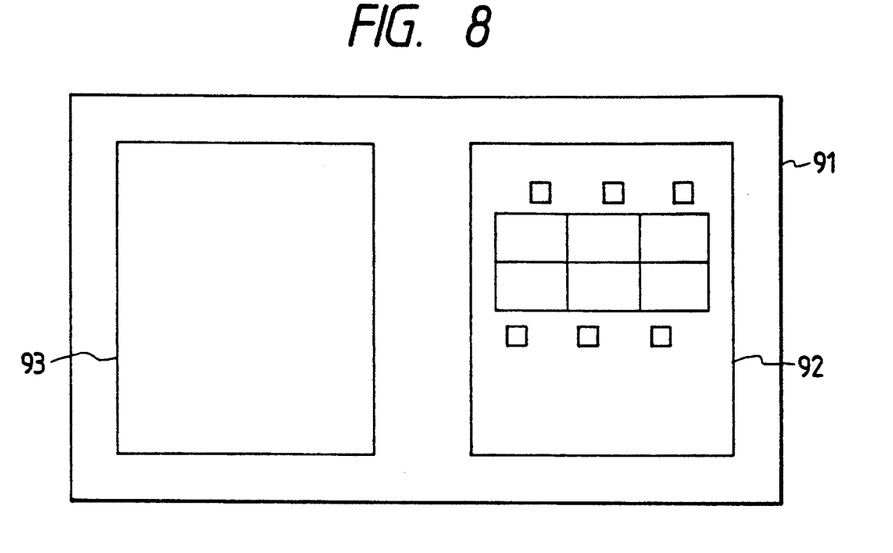
FIG. 8 is an explanatory diagram showing an exemplary display of a document image without a lattice image.

The editing operation of cutting and pasting images with the above copying machine will now be described. Here, to facilitate the understanding of this operation, an example is presented wherein a new layout for rearranging desks within an establishment or office is prepared from an old layout. As shown in FIG. 8, the document image used for cutting 92 is displayed at the right side of screen 91 on display unit 51, and the pictures of desks shown in the old layout is cut and pasted to a blank document, i.e., pasting document image 93.

First, a cut/paste mode is selected from input unit 81 at UI 50 shown in FIG. 5. As a result, both compressor 55 and expander 56 are set in the through mode. Then, a first document, e.g., a document to be cut (hereinafter referred to as "cutting document"), is set at image input unit 6 and an instruction to start processing is issued from UI 50. As a result, image input unit 6 start reading the image of the cutting document and document image data is obtained. The document image data passes through compressor 55 that is set in the through mode and stored in hard disk unit 41 via page buffer 57. At this time, the correspondence between the image and its storing address is stored in either nonvolatile RAM 31 or a separately arranged memory. Then, the document image data is read from hard disk unit 41 and applied to UI 50 bypassing expander 56 that is also set in the through mode.

At UI 50, the presence, pattern, and interval of a lattice is specified from input unit 81, and based on such specification, lattice pattern selection data is applied from UI control circuit 82 to multiplexer 83, and a predetermined lattice is selected from a plurality of lattice image data shown in FIG. 6 and stored in lattice image data memory 84. The selected lattice image data is applied to OR circuit 85 together with the document image data applied through system bus 34a so that both document image data and lattice image data overlap each other to form document image data with a lattice. Since this image data has a resolution as high as that of printing section 3, the operation of thinning their pixels is performed by thinning circuit 86 so that the resolution of the thinned data will correspond to that of the display unit 51. The thinned document image data with lattice is displayed at a proper position on display unit 51 by display control unit 87. The display position is determined based on the display position data from UI interface control circuit 81.

Figure 9:
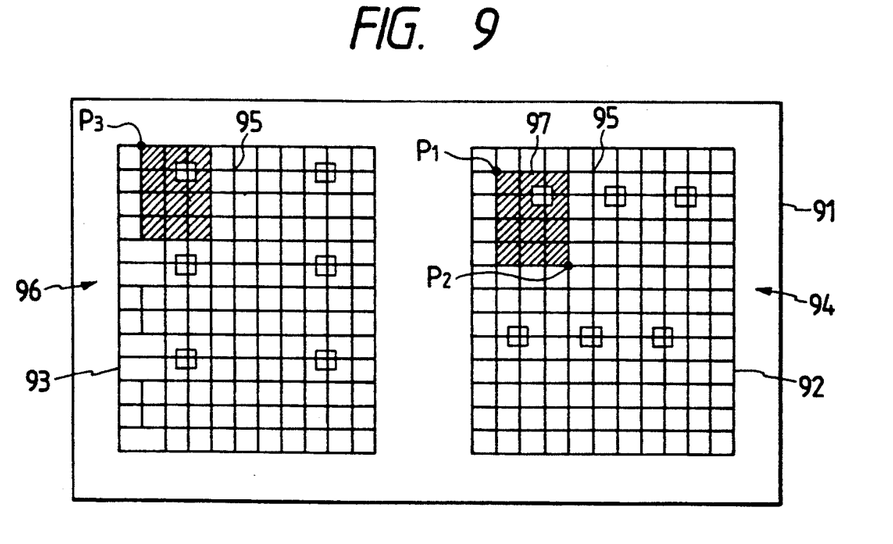
FIG. 9 is an explanatory diagram showing an exemplary display of a document image with a lattice image.

FIG. 9 shows an exemplary display of document image data with lattice 94, in which lattice image 95 and cutting document 92 overlap each other. Here, it is supposed that a pattern shown in FIG. 6(a) has been specified as lattice image 95.

Then, a second document, e.g., the pasting destination document (hereinafter referred to as "pasting document"), is set on image input unit 6 and its image is read, stored, read, and overlapped in the same way as above. And as shown in FIG. 9, document image with lattice 96 of the pasting document is displayed in juxtaposition with the document image with lattice 95 of the cutting document.

Then, a cutting region is specified by input unit 81 at UI 50. For example, coordinates $P_1$ and $P_2$ are specified by mouse 53, and then rectangular region 97 (shown as shaded) having these two points as vertices of a diagonal is specified. UI interface control unit 82, upon reception of the cutting region data from input unit 81, calculates address $A_{HD}$ at hard disk unit 41 of the image data corresponding to rectangular region 97 and applies the calculated address $A_{HD}$ to control section 2.

Then, a pasting region is specified by input unit 81 at UI 50. For example, pasting coordinate $P_3$ is specified. UI interface control unit 82, upon reception of the pasting region data from input unit 81, calculates address $A_{PB}$ on page buffer 57 of the image data corresponding to the specified region, and applies the calculated address $A_{PB}$ to control section 2. At this time, the document image data of pasting destination is contained in page buffer 57.

Successively, the cutting region data is read from hard disk unit 41 based on the calculated address $A_{HD}$ and stored in address $A_{PB}$ of page buffer 57. The image data at page buffer 57 is applied to UI 50 through expander 56 that is set in the through mode, printing section interface 61, and bus buffers 62, 48. As a result, the document images 92, 93 are displayed together with lattice image 95 on screen 91 of display unit 51 as shown in FIG. 9.

Thus, when cutting an image from the cutting document, the cutting region can be specified by referencing lattice image 95 that overlaps upon cutting document image 92 on the screen, thereby allowing the operator to make a correct specification. In pasting the cut image to the pasting document, the pasting region can be specified by referencing lattice image 95 that is overlapped upon pasting document image 93. This allows the operator to arrange cut out images in order with ease when they must be continuously arrayed, thus increasing the pasting efficiency. Such an arrangement wherein the pattern and interval of lattice image 95 can be selected in accordance with the type of document image contributes to further increasing the efficiency of the editing operation.

The cutting and pasting operations are repeated until the preparation of the layout image is completed. The completed image data is read from page buffer 57, applied to printing section 3 through expander 56 that is set in the through mode and printing section interface 61, and printed on a recording sheet.

While in the above embodiment both cutting document image 92 and pasting document image 93 are displayed on a single screen, it may be possible to display each document image by switching one from the other or by scrolling the screen.

Further, while the coordinates specified by the operator are employed as the editing coordinates in the above embodiment, it may be possible to forcibly convert the pasting region coordinates to the lattice coordinates closest to the coordinates specified by the operator when specifying the pasting coordinates. In this case, the pasting region coordinates are correctly lined up automatically even if the operator specification is not exactly correct, thereby further facilitating the editing operation.

As described in the foregoing pages, the present invention allows the lattice image to be displayed over the document image during document editing operation. Therefore, it is possible to specify the regions correctly by referencing the lattice image.

The foregoing description of the preferred embodiment of the invention has been presented for purposes of illustration and description. It is not intended to be exhaustive or to limit the invention to the precise from disclosed, and the modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processor for displaying an image of a document on a display unit by storing image data of said document in a storing unit and providing said image data read from said storing unit to said display unit, said image processor comprising:

a lattice image data memory for storing lattice image data; and means, electrically coupled to the storing unit and to said lattice image data memory, for superimposing said image data read from said storing unit and said lattice image data read from said lattice image data memory on each other and providing the superimposed image data to said display unit.

2. The image processor of claim 1, wherein said lattice image data consists of a plurality of lattice image data whose patterns are different from one another.

3. The image processor of claim 1, wherein said lattice image data consists of a plurality of lattice image data whose intervals are different from one another.

4. An image processor for displaying an image of a document to be edited on a display unit by storing image data of said document in a storing unit and providing said image data read from said storing unit to said display unit, said image processor comprising:

a lattice image data memory for storing lattice image data;

means, electrically coupled to the storing unit and to said lattice image data memory, for superimposing said image data read from said storing unit and said lattice image data read from said lattice image data memory on each other and providing the superimposed image data to said display unit; and editing means for designating a section of said document to be edited by specifying specific points of said lattice image data.

5. The image processor of claim 4, wherein said lattice image data consists of a plurality of lattice image data whose patterns are different from one another.

6. The image processor of claim 4, wherein said lattice image data consists of a plurality of lattice image data whose intervals are different from one another.

7. The image processor of claim 4, wherein said editing means provides means for selectively deleting the designated section of said document.

8. The image processor of claim 4, wherein said superimposing means superimposes said lattice image data on another document to be edited and provides the superimposed image data of both documents to said display unit.

9. The image processor of claim 8, wherein said editing means further provides means for designating sections of said another document to be edited by specifying specific points of said lattice image data.

10. The image processor of claim 9, wherein said editing means provides means for selectively exchanging the designated sections of said document and said another document.

11. The image processor of claim 9, wherein said editing means provides means for selectively moving the designated section of said document to the designated section of said another document.

12. The image processor of claim 9, wherein said editing means provides means for selectively copying the designated section of said document to the designated section of said another document.

13. The image processor of claim 4, wherein said editing means edits said image data stored in said storing unit by modifying, in a designated manner, a portion of said image data corresponding to the section of said document which is designated by said editing means.

14. The image processor of claim 13, further comprising:

printing means for printing the edited image data stored in said storing unit.

* * * * *